US008491768B2

(12) United States Patent
Ai et al.

(10) Patent No.: US 8,491,768 B2
(45) Date of Patent: Jul. 23, 2013

(54) METHOD OF PURIFYING NANOPARTICLES IN A COLLOID

(75) Inventors: Xin Ai, San Jose, CA (US); John David Bass, Union City, CA (US); Ho-Cheol Kim, San Jose, CA (US); Robert Dennis Miller, San Jose, CA (US); John Campbell Scott, Los Gatos, CA (US); Qing Song, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 12/821,953

(22) Filed: Jun. 23, 2010

(65) Prior Publication Data

US 2011/0315553 A1 Dec. 29, 2011

(51) Int. Cl.
*B01D 57/02* (2006.01)

(52) U.S. Cl.
USPC ........... 204/450; 204/551; 204/571; 204/573; 977/840

(58) Field of Classification Search
USPC ................. 204/450, 551, 560, 561, 563, 571, 204/573; 977/840
See application file for complete search history.

(56) References Cited

U.S. PATENT DOCUMENTS 3,844,838 A 10/1974 Louzos
4,569,739 A 2/1986 Klinkowski
5,171,409 A 12/1992 Barnier et al.
5,503,723 A 4/1996 Ruddy et al.
6,001,266 A 12/1999 Bier
6,686,207 B2 * 2/2004 Tupper et al. ................. 204/164
7,252,749 B2 * 8/2007 Zhou et al. .................... 204/484
7,510,638 B2 3/2009 Herman et al.
7,534,334 B1 * 5/2009 Fiechtner et al. ............. 204/547
2004/0197255 A1 * 10/2004 Nayfeh et al. .................. 205/74
2006/0032755 A1 * 2/2006 Herman et al. ............... 205/109
2006/0249388 A1 11/2006 Chang et al.
2007/0095667 A1 * 5/2007 Lau .............................. 204/450
2007/0235336 A1 * 10/2007 Carrier et al. ................ 204/571
2008/0060949 A1 * 3/2008 Unger et al. .................. 205/768
2008/0063587 A1 * 3/2008 Strano et al. ................. 204/450
2008/0093217 A1 4/2008 Wu et al.
2009/0090614 A1 4/2009 DiGiovanni et al.
2010/0101959 A1 * 4/2010 Bause et al. .................. 204/561

OTHER PUBLICATIONS

Mayer, A. et al. "Particles." Diesel Particulate Filter Manufacturers Task Force (Arbeitskreis Partikel-Filter-Systemhersteller). Oct. 2001.*

W. H. Li et al., "Analysis of dielectrophoretic electrode arrays for nanoparticle manipulation", Computational Materials Science 30 (2004) pp. 320-325.

N. G. Green et al., "Dielectrophoretic separation of nano-particles", J. Phys. D.: Appl. Phys. 30 (1997) L41-L44.

Veronica Saez et al., "Electro-deposition and stripping of catalytically active iron metal nanoparticles at boron-doped diamond electrodes", Electrochemistry Communications 9 (2007) pp. 1127-1133.

* cited by examiner

*Primary Examiner* — Keith Hendricks
*Assistant Examiner* — Steven A. Friday
(74) *Attorney, Agent, or Firm* — Daniel E. Johnson

(57) ABSTRACT

Nanoparticles in a colloid are purified, with the colloid including a fluid, unwanted matter, and the nanoparticles to be purified. An electric field is applied that is substantially spatially uniform over a distance that is at least equal to a characteristic dimension of the nanoparticles, so that at least some of the nanoparticles move towards at least one collection surface as a result of the force arising between their electrical charge and the electric field, whereupon nanoparticles are collected on said at least one collection surface. The collection surface(s) may be one or more electrodes to which a voltage potential is applied. The collected nanoparticles are then removed from the collection surface, e.g., by dispersing them into another fluid.

23 Claims, 12 Drawing Sheets

METHOD OF PURIFYING NANOPARTICLES IN A COLLOID

TECHNICAL FIELD

The invention relates to methods of purifying particles dispersed in a fluid, and more particularly to methods of purifying nanoparticles in a colloid.

BACKGROUND

There is an ongoing need to purify particles, both directly upon their synthesis and for the purposes of reusing and recycling them. Moreover, working with purified particles can be critical when conducting fundamental studies of their properties, since the purity of particles may be strongly correlated with their observed functional properties, as well as their stability. (See, for example, Kalyuzhny et al., "Ligand Effects on Optical Properties of CdSe Nanocrystals", The Journal of Physical Chemistry B, 2005, 109(15), pp. 7012-7021.) Common impurities include excess ligands and stabilizers, small organic and inorganic molecules, and residual solvent. The preparation of high purity nanoparticles (e.g., materials having at least one characteristic dimension between 0.5 nm and 1000 nm) can be especially difficult. Such materials must often be separated from residual reactants, excess ligands, solvents, and other materials present in the raw reaction solution.

Various techniques have been developed to address nanoparticle purification, but all suffer from shortcomings. The most common technique for nanoparticle purification is the precipitation-dissolution technique. (See, for example, Aldana et al., "Photochemical Instability of CdSe Nanocrystals Coated by Hydrophilic Thiols", Journal of the American Chemical Society, 2001, 123(36), pp. 8844-8850; Qu et al., "Alternative Routes toward High Quality CdSe Nanocrystals", Nano Letters, 2001, 1(6), pp. 333-337; and Yu et al., "Experimental Determination of the Extinction Coefficient of CdTe, CdSe, and CdS Nanocrystals", Chemistry of Materials, 2003; 15(14), pp. 2854-2860.) In this technique, a so-called nonsolvent is added to a colloidal nanoparticle solution until agglomeration or precipitation of the nanoparticles occurs. This technique involves a number of steps, however, which must be repeated, so that significant amounts of time and material (e.g., solvents) are required.

Dialysis is also used to separate particles. (See, for example, Xie et al., "Dendrimer-mediated synthesis of platinum nanoparticles: new insights from dialysis and atomic force microscopy measurements", Nanotechnology, 2005(7), p. S492.) A solution is placed in a membrane impermeable to the particles and then dipped into a pure solvent bath. The impurities pass through the membrane and into the solvent bath, which is refreshed from time to time. This process is very time consuming, since it relies on diffusion, and it can require a significant amount of solvent. This technique is especially problematic for purifying nanoparticles, since membrane materials with controlled pore size on the nanoscale are expensive.

Purification by ultra-filtration is achieved by passing a solution through a filter having very small pores that do not allow for the passage of the particles. (See, for example, Weng et al., "Exploring Feasibility for Application of Luminescent CdTe Quantum Dots Prepared in Aqueous Phase to Live Cell Imaging", Chinese Chemical Letters, 2006, 17(5), pp. 675-678.) This process becomes slower and more energy intensive as the particle size decreases, so that materials having a controlled pore size on the nanoscale, especially below 20 nm, are expensive to fabricate.

Diafiltration has also been used for purifying nanoparticles. (See, for example, Sweeney et al., "Rapid Purification and Size Separation of Gold Nanoparticles via Diafiltration", Journal of the American Chemical Society, 2006, 128(10), pp. 3190-3197; and Bianchi et al., "Purification of Nanoparticles by Hollow Fiber Diafiltration", in Nanotechnology 2008: Microsystems, Photonics, Sensors, Fluidics, Modeling and Simulation, Editor: Nano Science & Technology Institute, Cambridge, Mass., USA, Oct. 13, 2008.) Nanoparticles are separated from molecular impurities based on their larger size, in this case, by flowing the nanoparticles through a tubular nanoporous membrane. Membranes of this type are generally expensive and can suffer from fouling and clogging during use.

Size exclusion chromatography has also been used for the purification of colloidal nanoparticles. (See, for example, Wang et al., "Preparative size-exclusion chromatography for purification and characterization of colloidal quantum dots bound by chromophore-labeled polymers and low-molecular-weight chromophores", Journal of Chromatography A, 2009, 1216(25), pp. 5011-5019.) In this technique, colloidal solutions are passed through a porous stationary phase (e.g., Bio-Beads®). Smaller impurities, due to the longer accessible path in the pores, remain entrained in the column longer while the particles are passed more rapidly. Specific functionality can be added to the column to increase the residence time of the impurities. High-performance liquid chromatography has been used as well to separate nanoparticles (see Wang et al., ibid.). A solution containing the particles is passed through a packed column under high pressure. Copious amounts of solvents relative to purified product are used to elute the injected materials.

Dielectrophoretic electrode arrays have also been used for the separation and manipulation of particles. (See, for example, Li et al., "Analysis of dielectrophoretic electrode arrays for nanoparticle manipulation", Computational Materials Science, 30, 2004, pp. 320-325; and Green et al., "Dielectrophoretic separation of nano-particles", Journal of Physics D: Applied Physics, 30, 1997, L41-44.) An AC electric field (that is not spatially uniform) is applied to a collection of polarizable particles, such that the particles experience a translational force that depends both on the relative polarizability of the particles and the applied frequency. Specifically, particles whose polarizability is greater than that of the host medium tend to congregate where the electric field is strongest, whereas particles whose polarizability is less than that of the host medium tend to congregate where the electric field is weakest. Unfortunately, this technique does not lend itself to bulk processing.

Accordingly, the disadvantages of existing purification techniques become acute as the particle size is reduced to the nanometer scale, and as the size, weight, and solubility of the nanoparticles approach those of the impurities being removed. In addition, most current purification methods require significant labor, time, and materials (especially solvents), thereby increasing the cost and the environmental impact of the purification process.

SUMMARY

The current invention overcomes disadvantages of traditional techniques and allows for the efficient purification of particles in an environmentally sensitive manner. In preferred embodiments, a substantially spatially uniform electric field is applied to a colloid that includes both nanoparticles to be purified as well as unwanted matter, with the result being that nanoparticles are collected on one or more surfaces located in the colloid. For example, if electrodes within the colloid are used to generate the electric field, nanoparticles may be collected on one or more of the electrodes. Impurities are advantageously left behind in the remaining fluid, so that the collected nanoparticles may be redispersed in another fluid, thereby resulting in their purification. For example, the collection surface (e.g., electrode) may be removed from the fluid and placed in a different fluid. Alternatively, the collection surface can be left in place while the remaining fluid (which includes the impurities but relatively few of the nanoparticles) is removed and replaced with another fluid, at which point the collected nanoparticles can be introduced (e.g., dispersed) into the other fluid. In either case, the collected nanoparticles have been separated from unwanted matter.

One aspect of the invention is a method that comprises providing a colloid that includes i) a first fluid, ii) unwanted matter, and iii) nanoparticles that are dispersed in the first fluid. The nanoparticles have at least one characteristic dimension between 1 and 1000 nanometers, as well as electrical charge arising from being part of the colloid. An electric field is applied to at least a portion of the colloid, with the electric field being substantially spatially uniform over a distance that is at least equal to said characteristic dimension. This leads to at least some of the nanoparticles moving towards a collection surface as a result of the force arising between their electrical charge and the electric field, whereupon nanoparticles are collected on said collection surface. This allows the collection surface (having nanoparticles thereon) and the first fluid to be separated from each other. Nanoparticles on the collection surface are then dispersed into a second fluid, so that the concentration of the unwanted matter in the second fluid is less than the concentration of the unwanted matter in the first fluid. The nanoparticles in the second fluid can then be isolated and incorporated into (e.g., used in constructing) a device.

Another aspect of the invention is a method that comprises providing a colloid that includes i) a first fluid, ii) unwanted matter, and iii) nanoparticles that are dispersed in the first fluid, in which the nanoparticles have at least one characteristic dimension between 0.5 nanometer and 1000 nanometers. An electric field generated between electrodes is applied to at least a portion of the colloid. The electric field is substantially spatially uniform over a distance that is at least equal to said characteristic dimension, so that at least some of the nanoparticles move towards at least one of the electrodes as a result of the force arising between the electric field and electrical charge on the nanoparticles, whereupon nanoparticles are collected on said at least one of the electrodes. The method further includes separating said at least one of the electrodes (having nanoparticles thereon) and the first fluid from each other. The nanoparticles on said at least one of the electrodes are then dispersed into a second fluid, so that the concentration of the unwanted matter in the second fluid is less than the concentration of the unwanted matter in the first fluid.

BRIEF DESCRIPTION OF THE DRAWINGS

FIG. 1, which includes

FIG. 8, which includes

DETAILED DESCRIPTION

Preferred aspects of the invention are directed to purification methods that can be used with as-synthesized nanoparticles or nanoparticles to be recycled, including those that have already undergone some degree of purification. The methods may be employed with nanoparticles of practically any shape and composition, e.g., metals, metal oxides, semiconductors, carbons, polymers, and mixtures thereof. Additives may be optionally employed to improve the efficiency of the process, for instance, by changing the surface charge of the nanoparticles (e.g., long chain carboxylic acid or trioctylphosphine oxide may be used) or by facilitating redispersion of the nanoparticles into a fluid after they have been collected on a surface (e.g., through the addition of coordinating surfactants containing such moieties as amines, thiols, or phosphines). In addition, before redispersing the nanoparticles, the nanoparticles and/or collection surface can be washed with a nonsolvent to remove impurities that have been entrained in the nanoparticles or physically absorbed on the collection surface. In order to enhance the purification of the nanoparticles, the entire purification process may be repeated.

The advantages of the methods described herein compared to prior art techniques include greater speed, higher efficiency, lower cost, less materials consumption, less waste, and higher purity. Significantly, the methods are scalable to industry-level requirements. With preferred methods, nearly 100% of the nanoparticles in a colloid may be recovered in a matter of minutes using relatively little solvent. The methods described herein may be advantageously used with colloids including nanoparticles having at least one characteristic dimension between 0.5 and 1000 nanometers, between 1 and 1000 nanometers, or between 2 and 1000 nanometers, for example. By way of example, each of the nanoparticles may have a diameter that falls within one of these ranges. If quantum dots are used, they may have a characteristic dimension (e.g., diameter) between 2 and 20 nanometers, for example. Quantum dots such as CdTe, CdSe, CdS, InP, PbS, PbSe, InAs, $Bi_2S_3$, and core-shell materials such as CdSe/ZnS may be used with the methods disclosed herein.

Figure 1A:
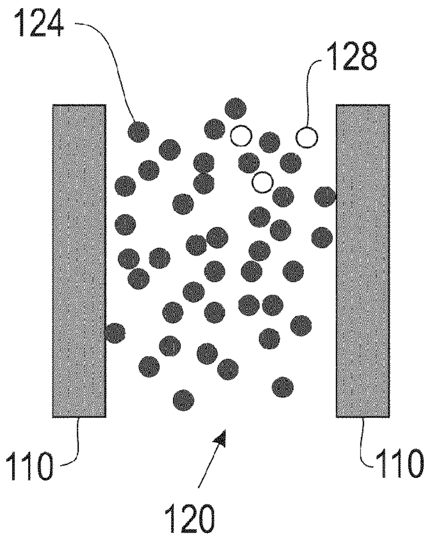
FIG. 1A and FIG. 1B, illustrates a purification method of the present invention, in which nanoparticles in solution (having negative charge) migrate to, and are collected on, the (positive) electrode upon the application of an electric field.

As shown in FIG. 1A, electrodes 110 may be advantageously used to generate an electric field within a colloid 120, in which the colloid includes nanoparticles 124 to be purified as well as unwanted matter 128, such as ligands and impurities. Either a DC or an AC electric field may be generated between the electrodes 110, provided that the electric field applied to the colloid is substantially spatially uniform over a distance at least equal to a characteristic dimension of the nanoparticles to be purified, i.e., movement of the nanoparticles can be generally described by the force arising between the electric field and the charges of the nanoparticles rather than by a dielectrophoretic force (arising between any dipoles within the nanoparticles and any electric field gradient), which is weaker. By way of example, the electric field may be substantially spatially uniform over a distance of 1000 nm (1 micron), 10 microns, or even longer distances, such as the distance between the electrodes used to generate the electric field (which in the examples disclosed herein is greater than 1 cm, but can be greater than 10 cm or even 100 cm in a device designed for commercial applications).

The electric field strength may be in the range of 1 V/cm to 10,000 V/cm, for example, but should not exceed the breakdown voltage of the colloid or the solvent. The electrodes themselves can be made of one or more metals, semiconductors, conducting polymers, carbons, conducting oxides, or transparent conducting oxides. The fluid (not explicitly shown) that is part of the colloid 120 can be a nonaqueous solution, aqueous solution, supercritical fluid, or ionic liquid.

Figure 1B:
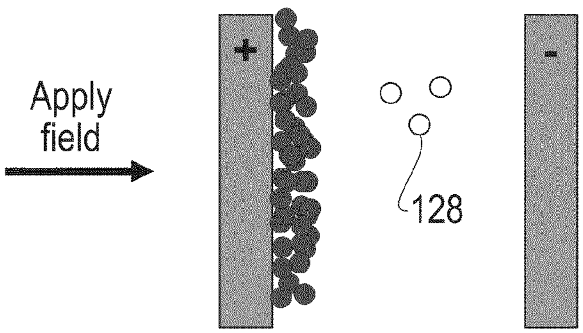

As shown in FIG. 1B, the result of applying this electric field is to attract the nanoparticles 124 (which in this example have negative charge) to the positively charged electrode, while the unwanted matter 128 is left behind in solution. This permits nanoparticles collected on the electrode to be isolated and purified, e.g., by redispersing them in a solvent. Thus, the nanoparticles in this example can be purified as a result of their reversible deposition onto an electrode. Alternatively, the absorbed particles can be collected as a solid. In either case, the absorbed particles may be washed prior to being dispersed or harvested. Once purified, the nanoparticles can be incorporated into devices, such as display components, fluorescence tags for biological assays, and optoelectronic devices.

Without wishing to be bound by theory, it is believed that the nanoparticles 124, which would not normally have an electrical charge if they were isolated, nevertheless acquire charge as a result of being in solution. For example, a nanoparticle may include a ligand loosely associated with a core portion of the nanoparticle. The ligand may have charge of one polarity, with the core of the nanoparticle having charge of the opposite polarity. Depending on how tightly bound the ligand is to the core of the nanoparticle, applying an electric field would attract the core of the nanoparticle to one of the electrodes. Another possibility is that any solvent used as part of the colloid and/or impurities in the solvent carry charge opposite to that of the nanoparticles. Also, it should be noted that the nanoparticles or their cores need not necessarily be continuously charged in order to be attracted to an electrode, but only part of the time, e.g., in the event that charge migrates back and forth between the nanoparticles and their ligands.

Figure 2:
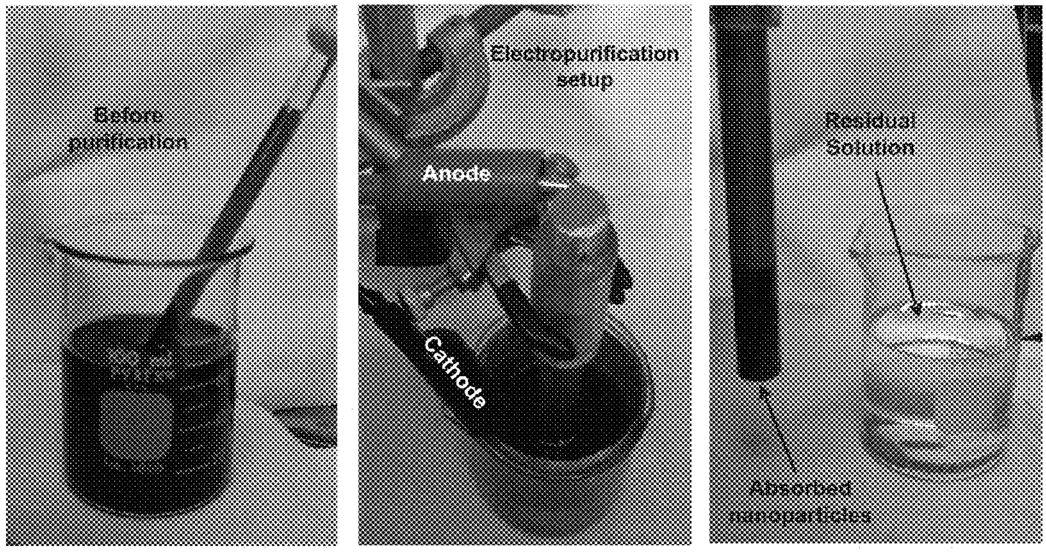
FIG. 2 illustrates an electropurification process for a solution of CdTe nanoparticles: before, during, and after deposition on an electrode.

A straightforward implementation of the invention using two electrodes in a nanoparticle solution is shown in FIG. 2, in which CdTe particles are collected and then removed from the residual solution (e.g., within a glove box to protect against degradation), all within a matter of minutes. (The working conditions here were similar to those in Example 1, infra.) The nearly colorless residual solution contains reaction impurities but only a tiny fraction of the nanoparticles initially in solution (on the order of 1%).

Figure 3:
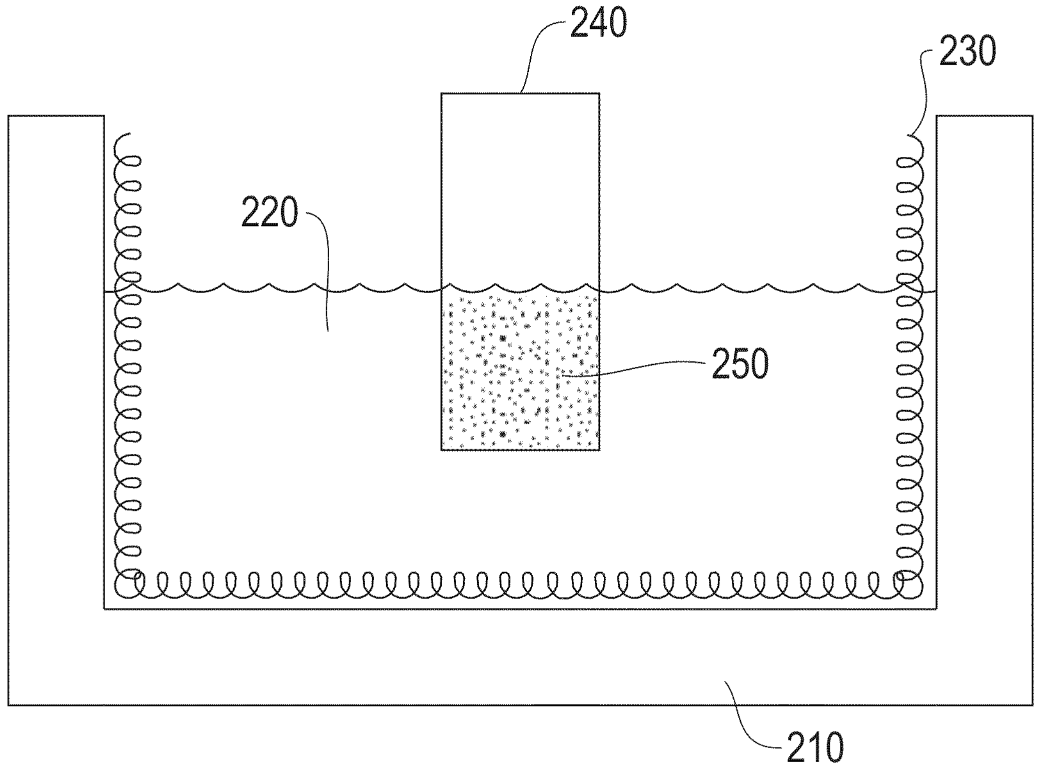
FIG. 3 is a cross sectional view of a nanoparticle purification device that runs in "batch" mode.

Another example of a batch process is illustrated in FIG. 3, in which a beaker or other container 210 is used to contain a colloid 220 that includes nanoparticles (as well as unwanted matter). In this example, a metallic (or more generally, conducting) element 230 along the circumference of the beaker acts as a cathode, whereas another metallic (or more generally, conducting) element 240 acts as the anode. Upon application of a voltage between the anode and cathode, nanoparticles 250 are collected onto the anode. The anode may be subsequently removed from the beaker 210, so that the collected nanoparticles can be recovered. Depending upon the applied polarity and the nature of the nanoparticles to be collected, nanoparticles may be collected on either metallic element 230 or 240 or both. Alternatively, one or more collection surfaces (not shown) other than the anode may be placed in the beaker 210 (e.g., a collection surface may surround element 240), so that nanoparticles are collected on them (e.g., uniformly across their surface) as a result of voltage being applied between metallic elements 230 and 240.

Figure 4:
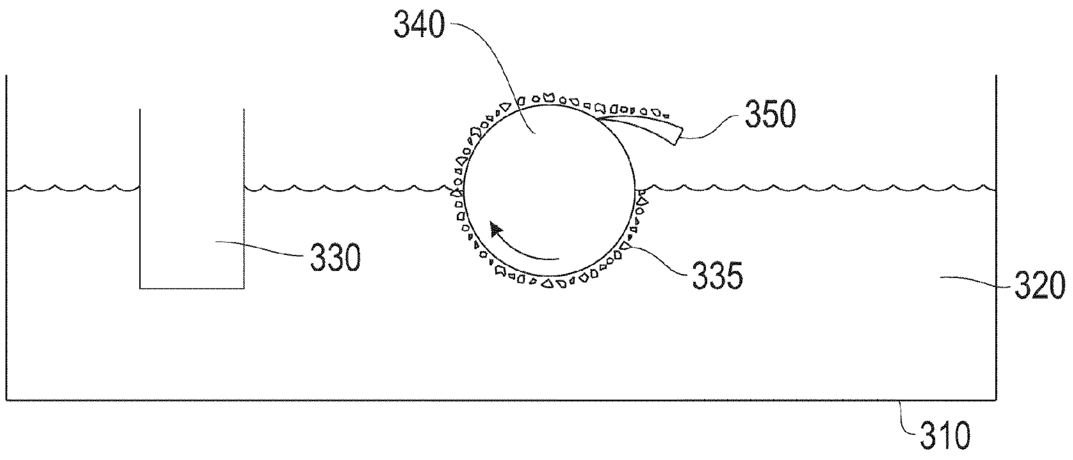
FIG. 4 is a cross sectional view of a nanoparticle purification device that runs in "semi-continuous" mode.
Figure 5:
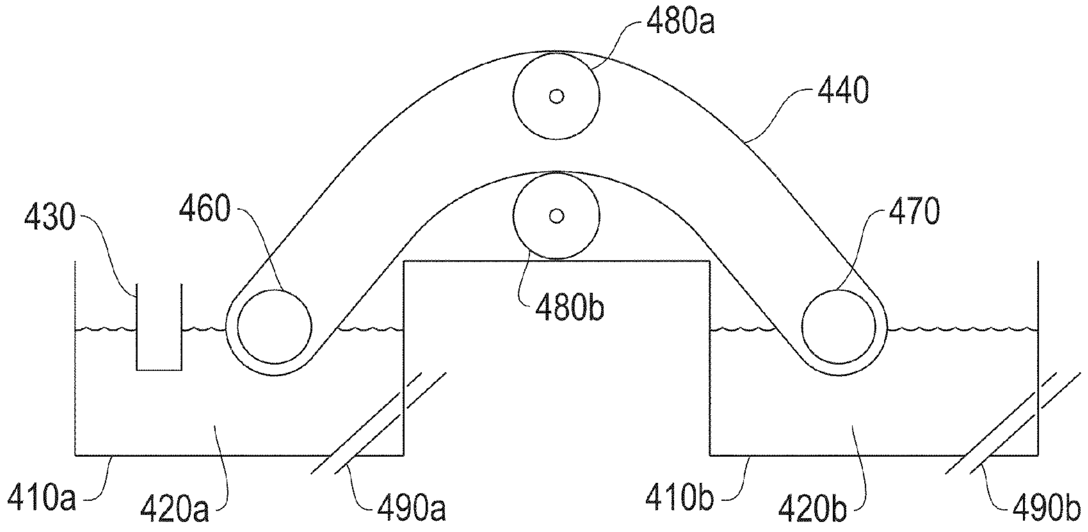
FIG. 5 is a cross sectional view of a nanoparticle purification device that runs in "continuous" mode.

In addition to batch processes, semi-continuous and continuous applications are also contemplated, as now described with respect to FIGS. 4 and 5, respectively. The schematic of FIG. 4 shows a container 310 holding a colloid 320 that includes nanoparticles to be purified (as well as unwanted matter). A cathode 330 is placed in the colloid 320. Also shown is an anode 340 (e.g., in the form of a drum, disk, etc.), which rotates through the colloid 320 and collects nanoparticles 335 as it does so, thereby forming a layer of them on the anode. As the anode 340 rotates, a scraper 350 detaches the collected nanoparticles, which can then be transferred to a beaker or other container (not shown), for example. The nanoparticles are preferably removed from the anode 340 before they form a layer thick enough that the collection efficiency is unacceptably reduced. The process may be continued until the solution is clear, e.g., until a significant fraction of the nanoparticles has been collected, at which point the solution may be exchanged for another colloid having nanoparticles to be purified therein. The anode and cathode here and in the other embodiments herein can be made of Al or steel, for example.

The continuous process shown in FIG. 5 makes use of two containers 410*a* and 410*b*, which hold the colloid 420*a* (with the nanoparticles to be purified) and the solution 420*b* (with the purified nanoparticles), respectively. A voltage potential is applied between a cathode 430 and an anode 440 in the form of a sheet (e.g., made of Al) that rotates over an element 460, another element 470 located in container 410*b*, and over still other elements 480*a* and 480*b*. Note that a potential can be applied to the anode 440 by one or more metallic brushes (not shown). Nanoparticles are collected on the anode 440 in container 410*a* but are then dispersed in the solution 420*b* as the sheet continues to rotate. The process can be made continuous by feeding colloid through an input line 490*a* and extracting the solution 420*b* through an output line 490*b*.

EXAMPLES

The following examples are intended to provide those of ordinary skill in the art with a complete disclosure and description of how to use the methods disclosed and claimed herein. Efforts have been made to ensure accuracy with respect to measured numbers, but allowance should be made for the possibility of errors and deviations. Unless indicated otherwise, parts are parts by weight, temperature is in ° C., and pressure is at or near atmospheric. All chemicals and materials were obtained commercially or were synthesized using known procedures.

Where appropriate, the following techniques and equipment were utilized in the examples: $^1$H NMR spectra were obtained at room temperature on an Avance 400 spectrometer in either d-toluene or d-$CHCl_3$. Fourier transfer infrared spectroscopy (FTIR) was performed on a Thermo Nicolet Nexus 670 in transmission mode on samples spread onto silicon wafers. The high voltage source was a Fluke 415B high voltage power supply. Photoluminescent spectra were collected on a Jobin Yvon Fluorolog. UV/Vis absorbance spectra were obtained on a Varian Cary 400 Bio spectrophotometer using samples diluted in toluene. Oleic acid-capped CdTe nanoparticles or tetrapods and octodecylphosphonic acid-capped CdSe/CdS nanorods were synthesized by known procedures. (See, for example, Yu et al., supra; and L. Carbone et al., "Synthesis and Micrometer-Scale Assembly of Colloidal CdSe/CdS Nanorods Prepared by a Seeded Growth Approach", Nano Letters, 2007, 7 (10), pp. 2942-2950.)

Example 1

Figure 6:
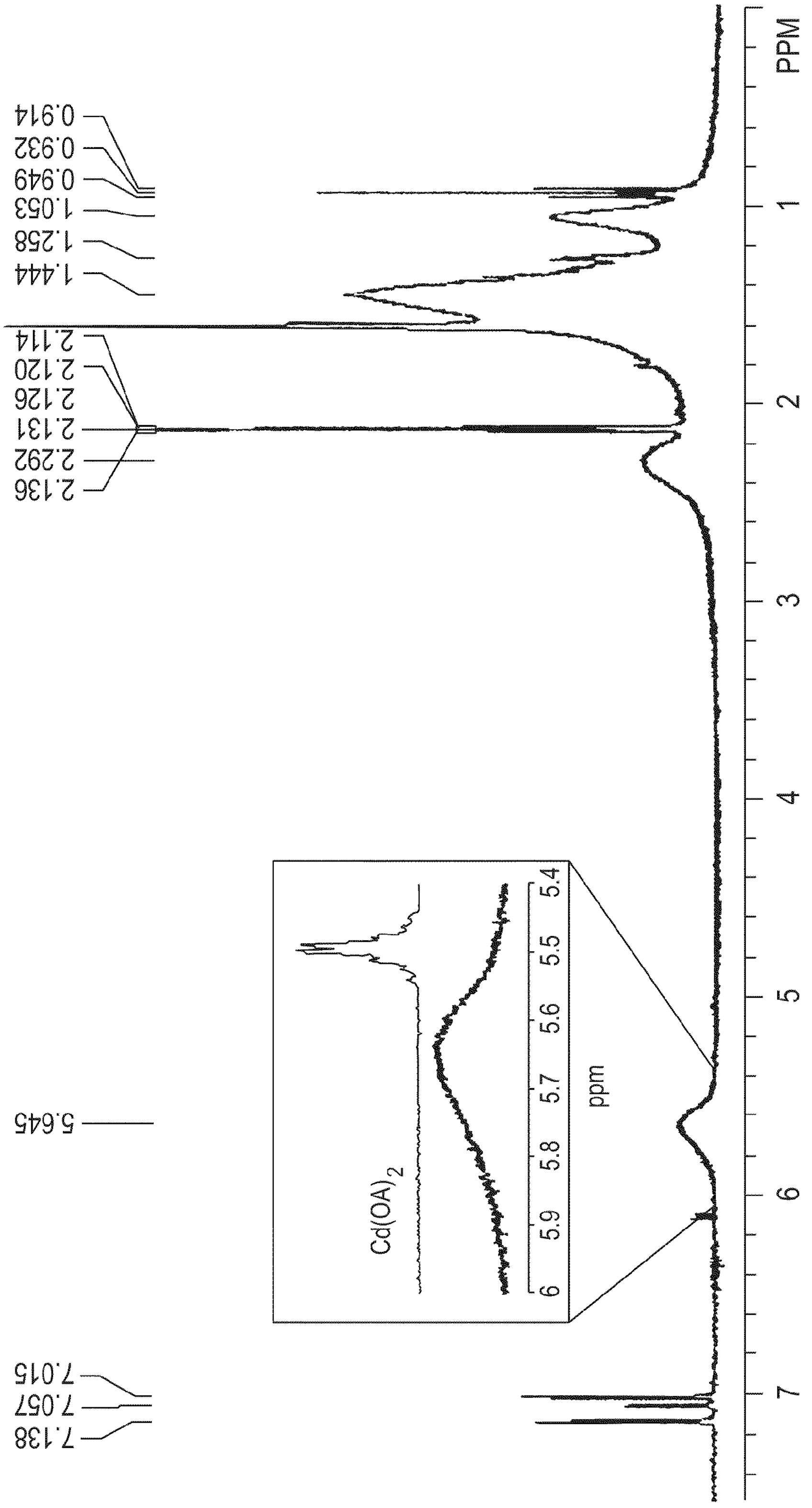
FIG. 6 shows a $H^1$ NMR spectrum of purified cadmium-rich, oleic acid-capped CdTe "quantum dots". Note that the broad signals correspond to bound ligands, whereas the sharp peaks are due to residual solvent (hexane) and the deuterated solvent.

Oleic Acid/tributyl Phosphine Capped CdTe Nanoparticles with Mixed Morphology A 10 ml sample of CdTe-Oleic acid nanoparticles (quantum dots) synthesized via known procedures was placed in a 30 ml glass beaker (hexane was added after synthesis). The solution mixture contained ~60.3 v % octadecene, 0.7 v % tributylphosphine, 8.5 mM CdTe-Oleic acid (the CdTe-Oleic acid nanoparticles concentration was determined by the method reported in Yu et al., supra), 39.0 v % hexane, as well as unwanted matter (e.g., any unreacted precursors). Two FTO (fluorine doped tin oxide) coated glass electrodes were placed in the solution mixture ~1" apart from each other. A DC potential of 500V was set across the electrodes, and 15 ml of acetone was slowly added to the beaker over ~5 min. After ~15 min, the CdTe-Oleic acid nanoparticles were seen to be absorbed on the positive electrode, while the solution turned almost completely colorless. The electrodes were removed from the solution mixture, and the potential voltage to the electrodes was turned off. The collected nanoparticles were washed with ~5 ml of acetone and finally redissolved in toluene. Analysis of the absorption at the first exciton peak of the nanoparticles (~644 nm) indicated that 94% of the nanoparticles were recovered. $H^1$ NMR (see FIG. 6) showed no observable signals from either free oleic acid, Cd(oleic acid)$_2$ precursor, octadecene, or tributylphosphine. The broad $H^1$ NMR peaks indicate that the protons are on bound molecules (rather than being "free" in solution). Note the shift and broadening compared to the Cd(oleic acid)$_2$ precursor (see inset).

Figure 7:
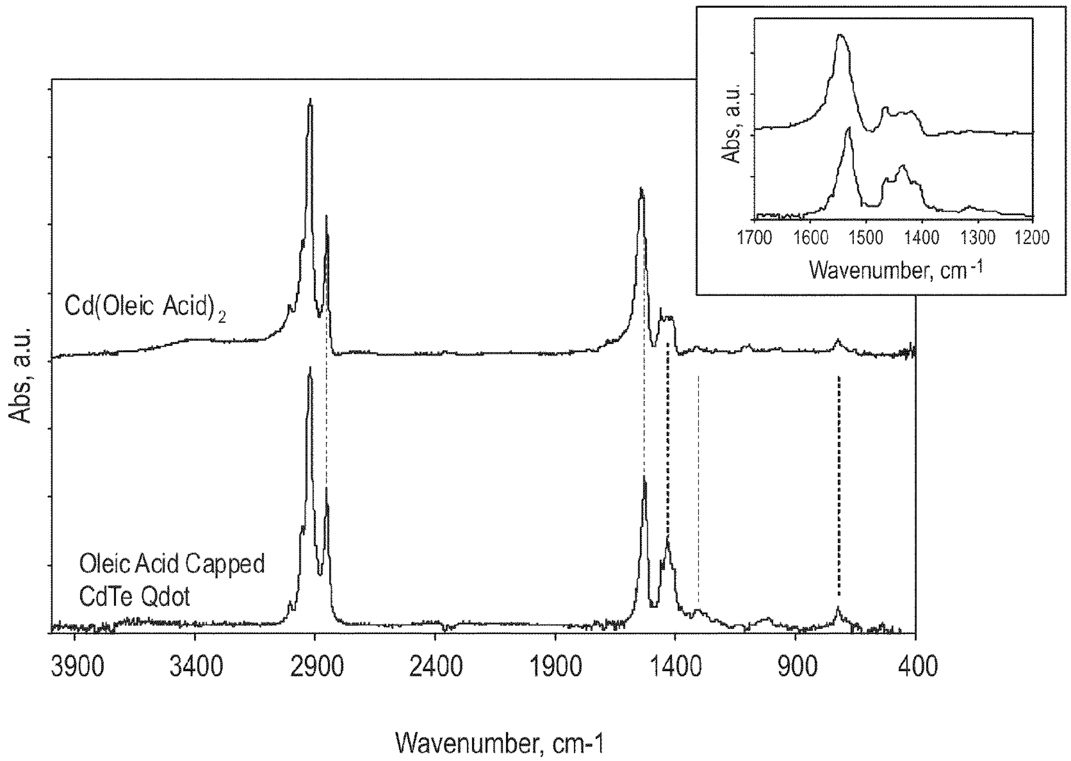
FIG. 7 shows FTIR traces of purified cadmium-rich, oleic acid-capped CdTe "quantum dots" similar to those used in collecting the data of FIG. 6 (bottom trace) and the signal of their cadmium precursor (top trace). Note the shift in the carbonyl signal from 1550 to 1530 $cm^{-1}$ due to the change in coordination at the cadmium center.

This procedure was repeated (with at most minor variations) and FTIR analyses were performed (see FIG. 7). Note that there is a shift in the carbonyl signal from 1550 to 1530 $cm^{-1}$ due to the change in coordination at the cadmium center going from the Cd(oleic acid)$_2$ precursor to the purified quantum dots.

Figure 8A:
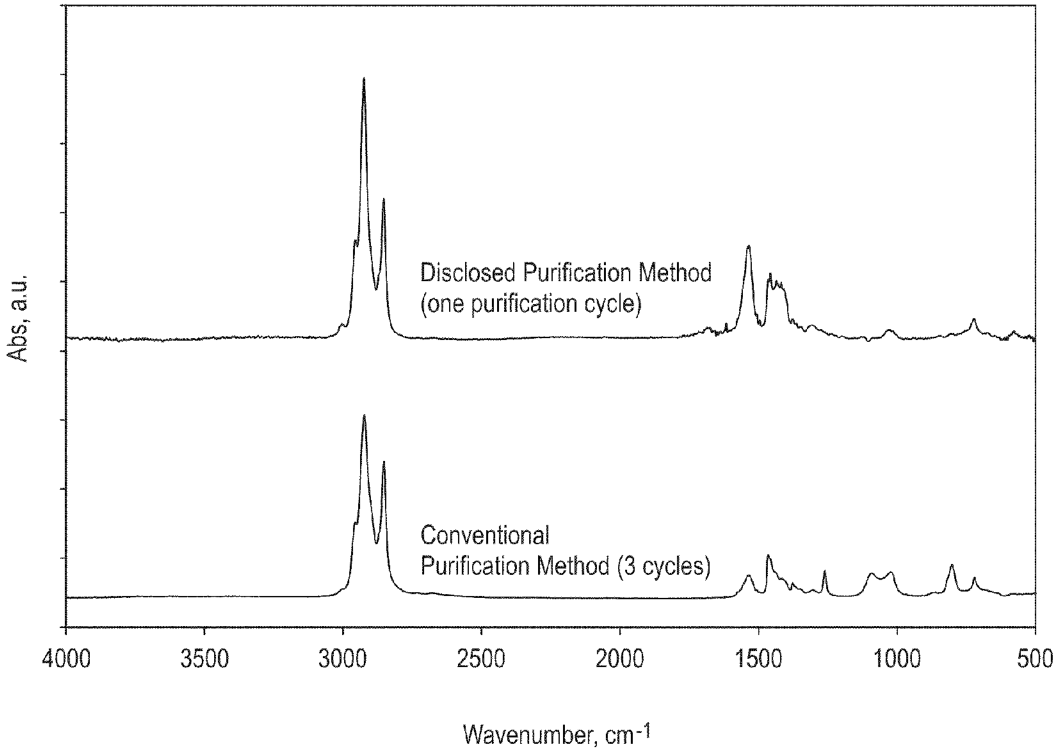
FIGS. 8A and 8B, show FTIR spectra (top) and $^1H$ NMR spectra (bottom), in which cadmium-rich, oleic acid-capped CdTe "quantum dots" were purified using either the disclosed purification method or a conventional process. The starting material in each case came from the same batch of CdTe "quantum dots".
Figure 8B:
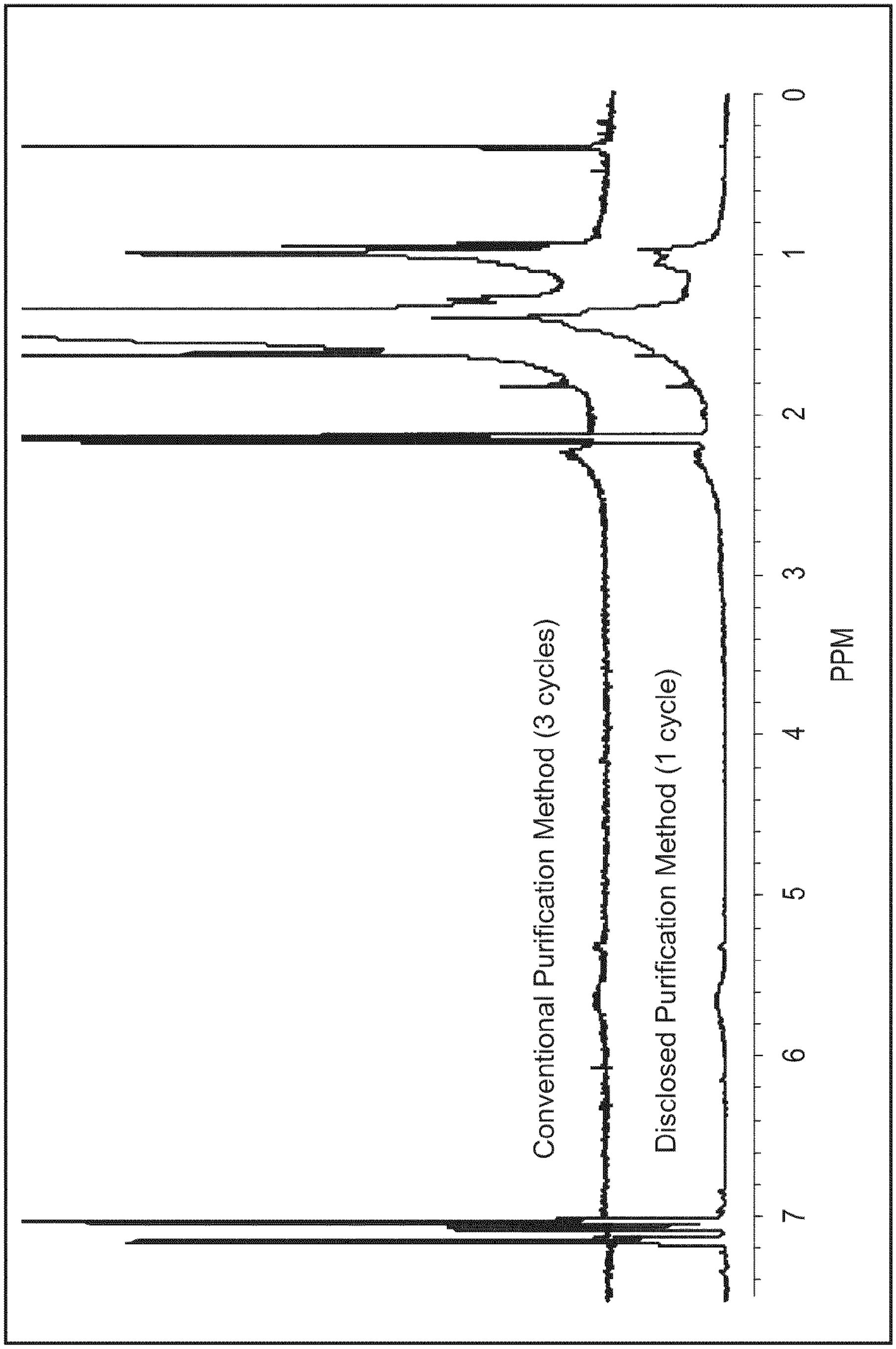

Comparing $^1$H NMR and FTIR spectra of i) CdTe-Oleic acid quantum dots purified conventionally through 3 cycles of precipitation-dissolution and ii) CdTe-Oleic acid quantum dots purified via the just-described procedure (with at most minor variations) suggests that the latter CdTe-Oleic acid is of at least comparable purity (see FIG. 8). The conventionally purified CdTe-Oleic acid quantum dots show stronger signals exogenous to the CdTe-Oleic acid quantum dot/ligand system.

Example 2

CdTe Tetrapods (Capped with Oleic Acid and Trioctylphosphine)

Figure 9:
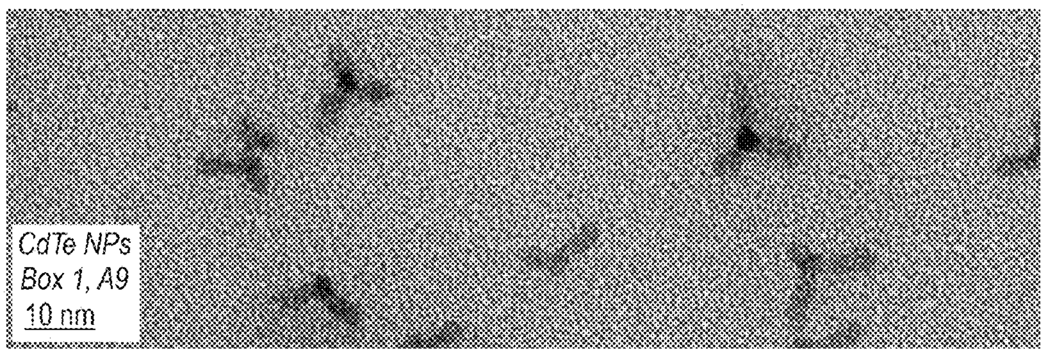
FIG. 9 is a TEM image of tetrapodal CdTe "quantum dots" capped with oleic acid and trioctylphosphine (CdTe-Oleic acid/TOP).
Figure 10:
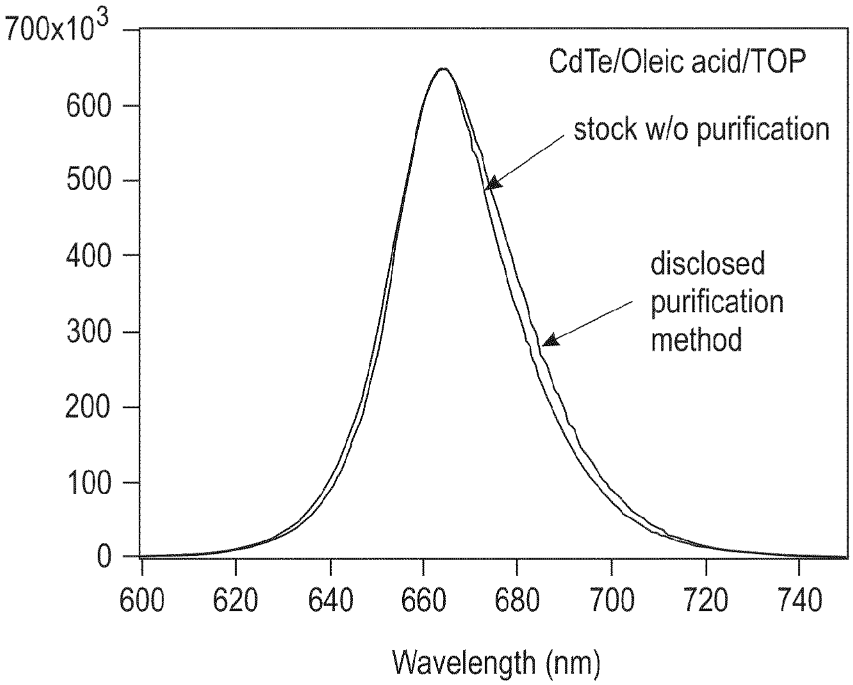
FIG. 10 presents fluorescence and absorption spectra of the CdTe-Oleic acid/TOP quantum dots of FIG. 9 (labeled "disclosed purification method"), the assynthesized material (labeled "stock"), and conventionally purified stock material obtained from multiple precipitation-dissolution cycles with centrifugation (labeled "conventional purification"). No significant shift in the visible absorption or fluorescence spectra from the as-synthesized state is evident, suggesting that no significant chemical or physical alteration takes place during purification.
Figure 10:
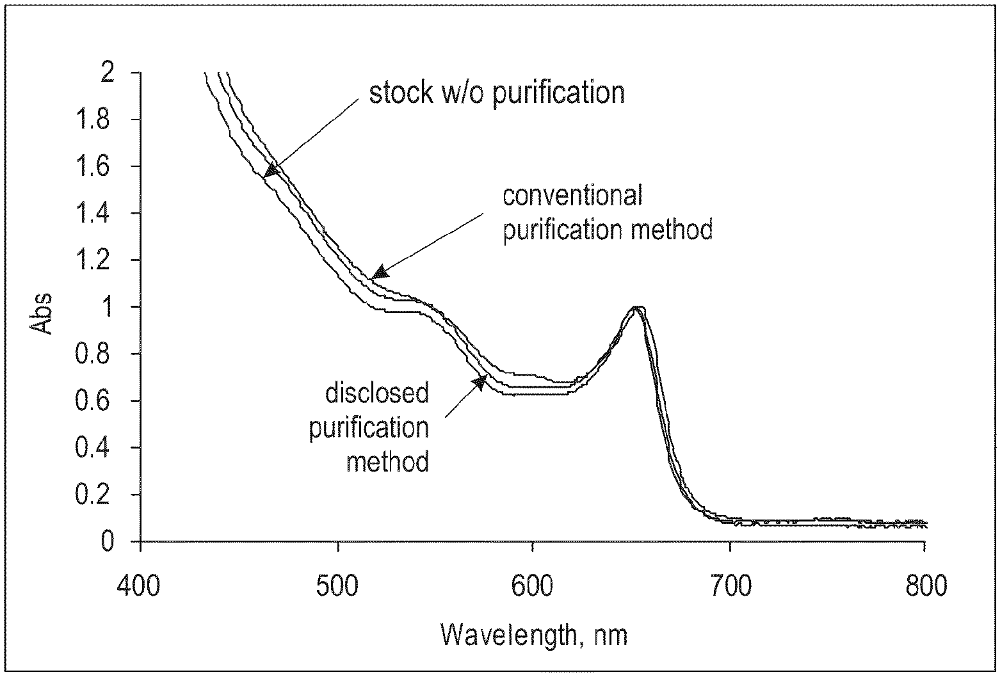

CdTe "quantum dots" capped with oleic acid and trioctylphosphine (CdTe-Oleic acid/TOP) with a tetrapod shape (see FIG. 9) were purified from a raw reaction solution diluted by hexane. A 12 ml sample of CdTe-Oleic acid/TOP synthesized via known procedures was placed in a 100 ml glass beaker. The raw reaction solution mixture contained ~43 v % octadecene, 14 v % trioctylphosphine, 6.0 mM tetrapod shaped CdTe (including unwanted matter such as unreacted precursors), and 43 v % hexane. A stainless steel mesh cathode was used in a concentric geometry with a ½" diameter aluminum anode. The spacing between the electrodes was ~1½". A DC potential of 200V was set across the electrodes, and 30 ml of acetone was slowly added to the beaker over ~20 min. When the collection process slowed, the anode was removed along with the CdTe-Oleic acid/TOP quantum dots thereon ("first collected portion"). The voltage potential to the electrodes was turned off, and the anode with the collected quantum dots was immersed in acetone, removed from the acetone, and then rinsed 3 times with fresh acetone, vacuum dried, and dissolved in toluene. The unpurified CdTe-Oleic acid/TOP quantum dots still remaining in solution were collected at 200V for 10 min followed by 500V for 2½ min, thereby yielding a second collected portion. The same washing procedure was applied, and the second collected portion was dissolved in the same toluene solution as the first collected portion. Absorption and fluorescence spectra show a clean product with no significant shift from the as-synthesized state (see FIG. 10), providing strong experimental evidence that no significant chemical or physical alteration of the nanoparticles takes place as a result of the purification.

Example 3

Figure 11:
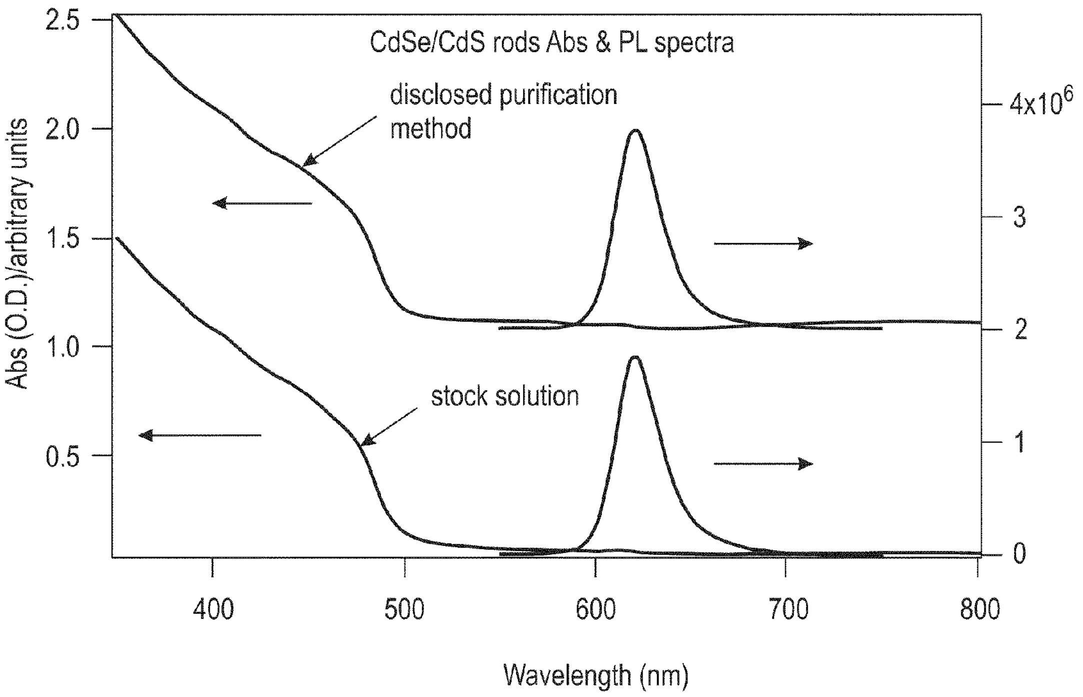
FIG. 11 presents UV-visible absorption and fluorescence spectra for CdS/CdSe nanorods purified in a semi-automated process, which indicate that no significant chemical or physical alteration takes place during purification.

CdSe/CdS Nanorods (5-10 nm in Diameter, 10-50 nm in Length) Capped with Alkyl Phosphonic Acid CdSe/CdS nanorods were purified directly from the crude reaction solution in a semi-automated process. Two 1 $in^2$ FTO electrodes were used (spacing ~0.75") at a potential of 500V. A raw toluene diluted reaction solution comprising trioctylphosphine oxide, dodecylphosphonic acid, octadecylphosphonic acid, trioctylphosphine, and CdSe/CdS nanorods was used. A computer-controlled dipping cycle exposed the anode under potential to a tank containing 12 ml of the reaction solution for 5-10 seconds. The anode was removed from this solution and dipped sequentially into 2 other tanks containing ~12 ml acetone (10 s for each tank), and finally into a tank containing 12 ml of $CHCl_3$ for 20 s. After dipping into the third tank, the now bare electrode was re-exposed to the first tank with the reaction solution, and the process was repeated until the quantum dots were removed from the first reaction solution. Some quantum dots that had delaminated from the FTO substrate upon exposure to the first acetone tank were washed 4 times with fresh acetone, dried in vacuum, and combined via redissolution with the fraction in the $CHCl_3$ collection tank. Absorbance and fluorescence spectra show no shifts from the as-synthesized material, once again suggesting that no significant chemical or physical alteration took place as a result of the purification (see FIG. 11). An NMR spectrum (not shown) revealed broad features, suggesting the presence of bound ligands, but no signals were found that correlated with unwanted impurities.

The invention may be embodied in other specific forms without departing from its spirit or essential characteristics. The described embodiments are to be considered in all respects only as illustrative and not restrictive. The scope of the invention is therefore indicated by the appended claims rather than the foregoing description. All changes within the meaning and range of equivalency of the claims are to be embraced within that scope.

The invention claimed is:

1. A method, comprising:

providing a colloid that includes i) a first fluid, ii) unwanted matter, and iii) quantum dots that are dispersed in the first fluid, wherein the quantum dots have at least one characteristic dimension between 1 and 1000 nanometers, the quantum dots having electrical charge arising from being part of the colloid;

applying, to at least a portion of the colloid, an electric field that is substantially spatially uniform over a distance that is at least equal to said characteristic dimension, so that at least some of the quantum dots move towards a collection surface as a result of the force arising between their electrical charge and the electric field, whereupon quantum dots are collected on the collection surface;

separating the collection surface having quantum dots thereon and the first fluid from each other; and dispersing quantum dots on the collection surface into a second fluid, wherein the concentration of the unwanted matter in the second fluid is less than the concentration of the unwanted matter in the first fluid.

2. The method of claim 1, further comprising:

isolating quantum dots from the second fluid; and incorporating the isolated quantum dots into a device.

3. The method of claim 1, wherein the collection surface includes an electrode to which voltage is applied, thereby generating the electric field.

4. The method of claim 3, comprising turning off the voltage prior to said separating step, said separating step including removing the collection surface from the first fluid.

5. The method of claim 1, wherein prior to said dispersing step, at least some unwanted matter is removed from the quantum dots collected on the collection surface.

6. The method of claim 1, wherein chemical agents in the first fluid facilitate deposition of quantum dots onto the collection surface.

7. The method of claim 1, wherein chemical agents are used to facilitate said dispersing of quantum dots into the second fluid.

8. The method of claim 1, wherein the method is employed in batch mode.

9. The method of claim 1, wherein the method is employed in continuous mode.

10. The method of claim 1, wherein the method is employed in semi-continuous mode.

11. The method of claim 1, wherein the first fluid includes a liquid.

12. The method of claim 1, wherein the first fluid includes a supercritical fluid.

13. The method of claim 1, wherein quantum dots in the second fluid and quantum dots in the first fluid are substantially identical in the chemical sense.

14. The method of claim 1, wherein the electric field is DC.

15. The method of claim 1, wherein the quantum dots are selected from the group consisting of CdTe, CdSe, CdS, InP, PbS, PbSe, InAs, and $Bi_2S_3$.

16. The method of claim 1, wherein the electric field is formed between two electrodes, each of which is in contact with the colloid.

17. The method of claim 1, wherein quantum dots are collected uniformly across the collection surface.

18. A method, comprising:

providing a colloid that includes i) a first fluid, ii) unwanted matter, and iii) quantum dots that are dispersed in the first fluid, wherein the quantum dots have at least one characteristic dimension between 0.5 nanometer and 1000 nanometers;

applying, to at least a portion of the colloid, an electric field that is generated between electrodes, the electric field being substantially spatially uniform over a distance that is at least equal to said characteristic dimension, so that at least some of the quantum dots move towards at least one of the electrodes as a result of the force arising between the electric field and electrical charge on the quantum dots, whereupon quantum dots are collected on said at least one of the electrodes;

separating said at least one of the electrodes having quantum dots thereon and the first fluid from each other; and dispersing quantum dots on said at least one of the electrodes into a second fluid, wherein the concentration of the unwanted matter in the second fluid is less than the concentration of the unwanted matter in the first fluid.

19. The method of claim 18, wherein the quantum dots are selected from the group consisting of CdTe, CdSe, CdS, InP, PbS, PbSe, InAs, and $Bi_2S_3$.

20. The method of claim 19, further comprising:

isolating quantum dots from the second fluid; and incorporating the isolated quantum dots into a device.

21. The method of claim 20, wherein the quantum dots include CdTe.

22. The method of claim 20, wherein the quantum dots include CdSe.

23. The method of claim 20, wherein the quantum dots include CdS.

* * * * *